US006926112B2

(12) United States Patent
Husain et al.

(10) Patent No.: US 6,926,112 B2
(45) Date of Patent: Aug. 9, 2005

(54) END OF TRAVEL SYSTEM AND METHOD FOR STEER BY WIRE SYSTEMS

(75) Inventors: Muqtada Husain, Brownstown, MI (US); John G. Oynoian, Taylor, MI (US); Kyi-Shin Shiah, Northville, MI (US); Robert T. Palmer, Ferndale, MI (US); Brian E. Daugherty, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 19 days.

(21) Appl. No.: 10/687,013

(22) Filed: Oct. 16, 2003

(65) Prior Publication Data

US 2005/0082106 A1    Apr. 21, 2005

(51) Int. Cl.$^7$ .................................................. B62D 5/04
(52) U.S. Cl. ........................ 180/402; 180/444; 180/446
(58) Field of Search ............................ 180/402, 403, 180/443, 444, 446; 701/41, 42

(56) References Cited

U.S. PATENT DOCUMENTS

| 3,580,352 | A |   | 5/1971  | Hestad             |         |
|-----------|---|---|---------|--------------------|---------|
| 4,558,759 | A |   | 12/1985 | Baatrup et al.     |         |
| 4,940,105 | A |   | 7/1990  | Matsunaga et al.   |         |
| 5,097,917 | A |   | 3/1992  | Serizawa et al.    |         |
| 5,247,441 | A |   | 9/1993  | Serizawa et al.    |         |
| 5,347,458 | A |   | 9/1994  | Serizawa et al.    |         |
| 5,896,942 | A | * | 4/1999  | Bohner et al. .....  | 180/402 |
| 5,908,457 | A |   | 6/1999  | Higashira et al.   |         |
| 6,138,788 | A |   | 10/2000 | Bohner et al.      |         |
| 6,219,604 | B1| * | 4/2001  | Dilger et al. ..... | 701/41  |
| 6,244,371 | B1|   | 6/2001  | Bohner et al.      |         |
| 6,269,903 | B1|   | 8/2001  | Bohner et al.      |         |
| 6,283,243 | B1|   | 9/2001  | Bohner et al.      |         |
| 6,336,519 | B1|   | 1/2002  | Bohner et al.      |         |
| 6,370,460 | B1|   | 4/2002  | Kaufmann et al.    |         |
| 6,389,343 | B1| * | 5/2002  | Hefner et al. .....  | 701/41  |
| 6,408,235 | B1|   | 6/2002  | Tanke, II et al.   |         |
| 6,422,335 | B1| * | 7/2002  | Miller ...........  | 180/446 |
| 6,481,526 | B1|   | 11/2002 | Millsap et al.     |         |
| 6,484,838 | B1| * | 11/2002 | B.o slashed.rsting et al. ............ | 180/402 |
| 6,523,637 | B1| * | 2/2003  | Nakano et al. .....  | 180/402 |
| 6,557,662 | B1| * | 5/2003  | Andonian et al. ... | 180/402 |

(Continued)

OTHER PUBLICATIONS

MRB-2107-3 Product Bulletin from Lord Corporation (webpage, date not available).

*Primary Examiner*—Avraham Lerner
*Assistant Examiner*—L. Lum
(74) *Attorney, Agent, or Firm*—Brinks Hofer Gilson & Lione

(57) ABSTRACT

The present invention provides a system for generating an end of travel feedback to the driver of a vehicle where the vehicle includes a steer by wire system. The system includes a steering wheel, a steering shaft, a motor, and a brake. The steering wheel is configured to control the steer by wire system. The steering shaft is coupled to the steering wheel and rotates in conjunction with the steering wheel. To provide road feel resistance to the driver, the motor is coupled to the steering shaft. Further, the brake is coupled to a shaft of the motor and is adapted to provide mechanical resistance when the road wheel is at an end of travel position.

25 Claims, 2 Drawing Sheets

U.S. PATENT DOCUMENTS

| | | |
|---|---|---|
| 6,575,263 B2 * | 6/2003 | Hjelsand et al. ............ 180/402 |
| 6,578,444 B1 | 6/2003 | Wendelin |
| 6,598,695 B1 * | 7/2003 | Menjak et al. .............. 180/402 |
| 6,612,392 B2 * | 9/2003 | Park et al. .................. 180/402 |
| 6,728,615 B1 * | 4/2004 | Yao et al. ..................... 701/41 |
| 6,751,539 B2 * | 6/2004 | Uenuma et al. .............. 701/41 |
| 2001/0032749 A1 | 10/2001 | Thomas et al. |
| 2002/0059021 A1 | 5/2002 | Nishizaki et al. |
| 2002/0092696 A1 | 7/2002 | Bohner et al. |
| 2002/0162700 A1 | 11/2002 | Moser et al. |
| 2002/0189888 A1 | 12/2002 | Magnus et al. |
| 2003/0127274 A1 | 7/2003 | Dominke et al. |

* cited by examiner

END OF TRAVEL SYSTEM AND METHOD FOR STEER BY WIRE SYSTEMS

BACKGROUND

1. Field of the Invention

The present invention generally relates to a steer by wire system. More specifically, the invention relates to an end of travel and method for a steer by wire system.

2. Description of Related Art

In a conventional steering system, the steering wheel is mechanically connected to the steering shaft. When the mechanical end of travel of the vehicle wheels or the steering gear is reached, (an "end of travel" condition), the steering wheel cannot be rotated any further due to high mechanical resistance. However, in normal operation a steer by wire system has no mechanical coupling to the steering gear. The lack of feedback torque for the driver at the end of travel condition is unfamiliar and uncomfortable for the driver. In addition, extensive use of the steering system in an end of travel condition such as the limit of steering gear travel or an against curb condition can cause additional wear to the vehicle and may lead to early replacement of various system components.

To simulate the feel of a mechanically connected steering system, many steer by wire systems have incorporated an electric motor coupled to the steering wheel. The electric motor is designed to simulate the resistance patterns of a conventional mechanically connected steering system. When the end of travel conditions are encountered in a steer by wire system, the driver can continue turning the steering wheel contrary to a conventional mechanically connected steering system. To simulate an end of travel condition of a conventional steering system, some steer by wire systems have incorporated a brake directly coupled to the steering shaft. The brake can be engaged to prevent the driver from turning the steering wheel any further. Unfortunately, these brakes consume a significant amount of power and occupy a significant amount of space when attached directly to the steering shaft.

In view of the above, it is apparent that there exists a need for an improved power module for automotive switching applications.

SUMMARY

In satisfying the above need, as well as overcoming the enumerated drawbacks and other limitations of the related art, the present invention provides a system for generating an end of travel feedback to the driver of a vehicle having a steer by wire system. The system includes a steering wheel, a steering shaft, a motor, and a brake. The steering wheel is configured to provide the input for the steer by wire system. The steering shaft rotates together with the steering wheel. To provide road feel resistance or feedback to the driver, the motor supplies torque to the steering shaft. The brake is coupled to the motor shaft. When an end of travel condition is reached, the brake is energized to provide end of travel resistance or feedback to the driver through the steering shaft. An end of travel condition can occur due to limits in the range of motion of the steering system or alternatively due to external influences limiting the angle of the road wheel.

In another aspect of the invention, the brake is a friction brake. Further, a torque transfer mechanism is coupled between the shaft of the motor and the steering shaft. The torque transfer mechanism multiplies the torque transferred from the feedback motor to the steering shaft. Further, a controller is integrated with the system and adapted to sense when the road wheel or steering system has reached an end of travel position such that the road wheel angle is restricted by the mechanical range of the steering system.

The controller senses the end of travel condition based on the angle of the road wheel, the rate of change of the road wheel, the current draw of a second motor used to manipulate the road wheel, other means, or a combination thereof. When the end of travel position is reached, the controller engages the brake. Further, the controller is adapted to disengage the brake when the steering wheel is manipulated to rotate the road wheel away from the end of travel position. The controller may sense the driver's intent to manipulate the steering wheel away from the road wheel position based on the steering wheel angle, the rate of change of the steering wheel angle, the torque applied to the steering wheel, other means, or a combination thereof.

An end of travel condition can also occur when the angle of the road wheel is restricted due to the road wheel pushing against an object such as a curb. The against curb condition may be sensed by the controller based on the current of the second motor used to control the angle of the road wheel, the road wheel angle, the rate of change of the road wheel angle, a combination thereof, or other means. When the controller senses that the road wheel is in an against curb condition, the controller engages the brake.

Further objects, features and advantages of this invention will become readily apparent to persons skilled in the art after a review of the following description, with reference to the drawings and claims that are appended to and form a part of this specification.

DETAILED DESCRIPTION

Figure 1:
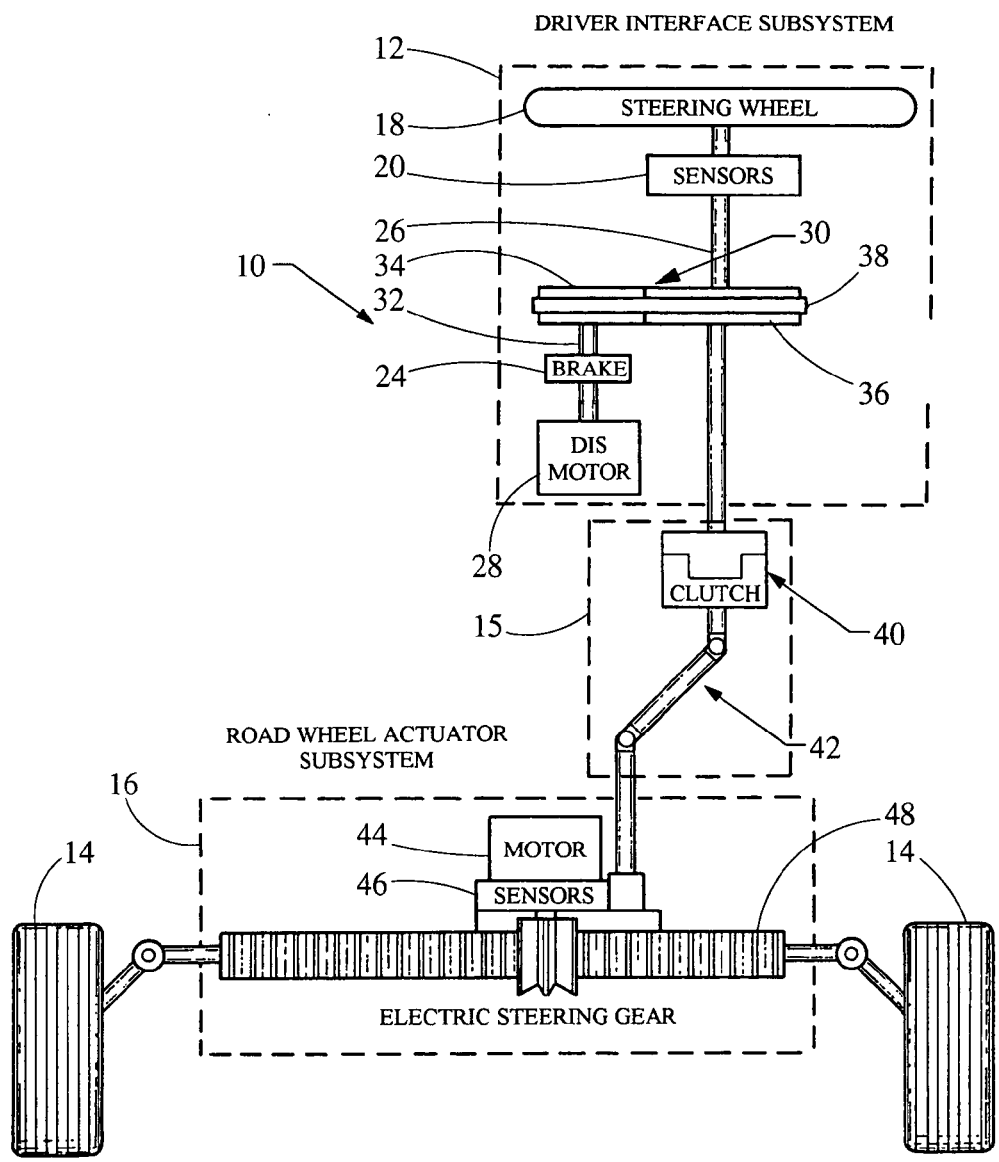
FIG. 1 is a diagrammatic view of a steer by wire system including a friction brake according to the present invention.

Referring now to the drawings, a steer by wire system embodying the principles of the present invention is illustrated therein and designated at 10. As its primary components, the steer by wire system 10 includes a driver interface subsystem 12, a manual backup steering subsystem 15, a road wheel actuator subsystem 16, and road wheels 14. The driver interface subsystem 12 is designed to sense the intent of the driver to control the road wheels 14. Further, the driver interface subsystem 12 also provides feedback to the driver corresponding to the instantaneous steering conditions.

Included in the driver interface subsystem 12 is a steering wheel 18, a series of sensors 20, a brake 24, a motor 28, and a steering shaft 26. The steering wheel 18 is connected to the steering shaft 26. As the steering wheel 18 is rotated, it causes the steering shaft 26 to be rotated in the same direction. The sensors 20 are connected to the steering wheel 18 or the steering shaft 26, and determine the steering wheel angle, the rate of change of the steering wheel angle, and the steering torque.

A motor 28 is coupled to the steering shaft 26 by a torque transfer mechanism 30. Based on the current steering conditions and pre-specified parameters such as an adjustable steering ratio, a maximum steering torque, and the desired feel, the driver interface subsystem motor 28 provides feedback torque to the steering wheel 18. The driver interface subsystem motor 28 has a shaft 32 connected to the torque transfer mechanism 30. The torque transfer mechanism 30 includes a first member 34 attached to the shaft 32 and a second member 36 attached to the steering shaft 26. The first member 34 rotates together with the shaft 32 while the second member 36 rotates with the steering shaft 26. The first member 34 is configured to the transfer torque to the second member 36. The first and second members may be engaged through a belt 36 or intermeshing gears. The first member 34 may also be a different size than the second member 36, thereby multiplying the torque provided to the steering shaft 26 by the driver interface system motor 28. The driver interface subsystem also includes a friction brake 24 attached to the shaft 32 of the motor 28. The friction brake 24 is energized to provide resistance to the steering shaft 26 when an end of travel condition occurs.

The manual backup steering subsystem 15 is configured to allow the driver to steer the vehicle in the event of a fault condition. When a fault condition occurs, the clutch 40 is engaged and mechanically couples the steering shaft 26 to the steering linkage 42. The direct coupling of the steering shaft 26 to the steering linkage 42 allows the driver to operate the vehicle in a backup mode until the fault condition can be corrected.

Based on the driver input received by the driver interface subsystem 12, the road wheel actuator subsystem 16 manipulates the angle of the road wheels 14. The road wheel actuator subsystem 16 includes a motor 44, sensors 46, and an electric steering gear 48. The motor 44 is controlled in response to the input, from the driver, sensed by the driver interface subsystem 12 to manipulate the electric steering gear 48 thereby controlling the angle of the road wheels 14. The sensors 46 sense the torque of the motor 44, the temperature of the motor 44, the rate of change of the road wheel angle, and the actual road wheel angle including the end of travel position. Further, the steering linkage 42 from the manual backup steering subsystem 15 is coupled to the electric steering gear 48 allowing the driver to manually manipulate the angle of the road wheels 14 when a steering system fault occurs and the clutch is engaged.

Figure 2:
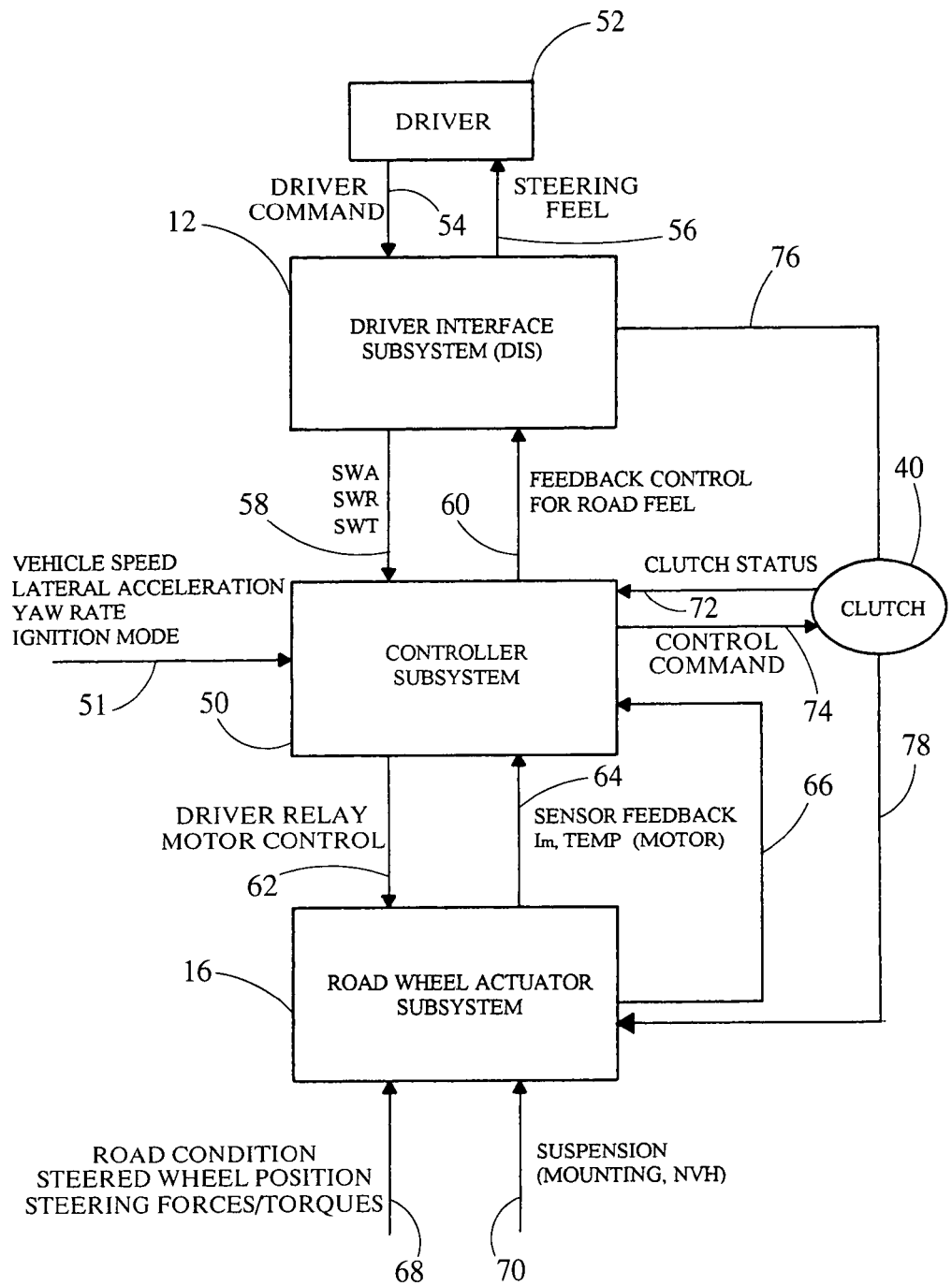
FIG. 2 is a block diagram of the control flow of a steer by wire system according to the present invention.

Now referring to FIG. 2, a block diagram of the control structure of a steer by wire system according to the present invention is shown. The driver represented by block 52 provides an input, as illustrated by line 54, to the driver interface subsystem 12 by turning the steering wheel 18. Conversely, the driver 52 receives feedback, steering feel, from the driver interface subsystem 12 through feedback torque or resistance, as illustrated by line 56, applied to the steering wheel. The driver interface subsystem 12 senses the motion of the steering wheel and determines the steering wheel parameters, including steering wheel angle (SWA), the rate of change of the steering wheel angle (SWR), and the steering wheel torque (SWT). The steering wheel parameters are then communicated to the controller subsystem as illustrated by line 58.

In addition to the steering wheel parameters, the controller subsystem 50 also receives vehicle parameters including the vehicle speed, lateral acceleration, yaw rate, and ignition mode as illustrated by line 51. The controller subsystem 50 interprets the vehicle parameters and the steering wheel parameters to generate corresponding motor control signals which are communicated to the road wheel actuator subsystem 16 as illustrated by line 62.

The road wheel actuator subsystem 16 is affected by changing environmental influences, such as the road condition and forces acting on the road wheels, as illustrated by line 68, and by the vehicle dynamics, such as the suspension and mounting structure, as illustrated by line 70. The road wheel actuator subsystem 16 provides feedback to the controller subsystem 50, including the motor current and motor temperature, as illustrated by line 64, and the road wheel angle and the rate of change of the road wheel angle, as illustrated by line 66.

The controller subsystem 50 interprets the feedback parameters provided from the road wheel actuator subsystem 16 and generates control signals that are communicated to the driver interface subsystem 12, as illustrated by line 60. In addition, the controller subsystem 50 continuously monitors for fault signals from both the driver interface subsystem 12 and the road wheel actuator subsystem 16 to determine if a fault condition has occurred. In the event of a fault condition, the controller subsystem 50 engages the clutch 40 through a command signal, illustrated by line 74. Engaging the clutch 40 directly couples the driver interface subsystem 12 to the road wheel actuator subsystem 16 through the clutch 40 as illustrated by lines 76 and 78. The controller subsystem 50 monitors the status of the clutch 40 through a clutch status signal communicated to the controller subsystem as illustrated by line 72.

In one aspect of the present invention, when the controller subsystem 50 receives feedback from the road wheel actuator subsystem indicating the road wheel is in an end of travel position, the controller subsystem 50 provides a control command, as illustrated by line 60 to engage the brake 24 of the driver interface subsystem 12. More specifically as shown in FIG. 1, the friction brake 24 provides resistance against the shaft 32 of the motor 28. The resistance from the brake 24 is multiplied through the torque transfer mechanism 30 and applied to the steering shaft 26 to inform the driver that the road wheel 14 is at an end of travel position. Using the brake 24 as an end of travel feedback mechanism provides a lower power and space efficient method to provide feedback to the driver regarding an end of travel condition. Alternatively, if the driver moves the steering wheel 18 in a direction indicating an intent to rotate the tire away from the end of travel position, the controller 50 disengages the brake 24, and the motor 44 manipulates the road wheels 14 away from the end of travel position.

In another aspect, the controller subsystem 50 monitors the motor current and the rate of change of the road wheel angle to determine if the road wheel 14 movement is being restrained by a curb. In the event the road wheel movement is being restrained by a curb (increased current without a corresponding change in road wheel angle), the controller subsystem 50 provides a control command, as illustrated by line 60, to engage the brake 24 of the driver interface subsystem 12. The resistance from the brake 24 is multiplied through the torque transfer mechanism 30 and applied to the steering shaft 26 to provide feedback informing the driver that an against curb condition is occurring and preventing the driver from further turning the steering wheel 18.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A system for providing an end of travel feedback from a road wheel to a driver of a vehicle, the vehicle including a steer by wire system, the system comprising:

a steering wheel configured to control the steer by wire system;

a steering shaft coupled to the steering wheel;

a first motor coupled to the steering shaft to provide road feel resistance to the driver;

a brake coupled to a shaft of the first motor adapted to provide mechanical resistance when the road wheel is in an end of travel condition a torque transfer mechanism configured to multiply a torque between the shaft of the first motor and the steering shaft.

2. The system according to claim 1, wherein the brake is a friction brake.

3. The system according to claim 1, further comprising a controller adapted to sense when the road wheel has reached an end of travel position and engage the brake as determined by the controller or a sensor.

4. The system according to claim 3, wherein the controller is adapted to engage the brake based on a road wheel angle determined by the sensor.

5. The system according to claim 3, wherein the controller is adapted to engage the brake based on a rate of change of a road wheel angle determined based on the sensor.

6. The system according to claim 3, further comprising a second motor to control an angle of the road wheel.

7. The system according to claim 6, wherein the controller is adapted to engage the brake based on a current draw of the second motor as determined by the controller.

8. The system according to claim 1, further comprising a controller adapted to disengage the brake when the steering wheel is manipulated to rotate the wheel away from the end of travel position.

9. The system according to claim 8, wherein the controller is adapted to disengage the brake based on an angle of the steering wheel determined by an angle sensor.

10. The system according to claim 8, wherein the controller is adapted to disengage the brake based on a rate of change of a steering wheel angle determined based on an angle sensor.

11. The system according to claim 8, wherein the controller is adapted to disengage the brake based on a torque applied to the steering wheel determined based on a torque sensor.

12. The system according to claim 1, further comprising a controller adapted to sense when an angle of the road wheel is restricted due to the road wheel pushing against an object as determined by the controller or a sensor.

13. The system according to claim 12, wherein the controller is adapted to engage the brake based on a current draw of a second motor configured to control the angle of the road wheel as determined by the controller.

14. The system according to claim 12, wherein the controller is adapted to engage the brake based on the angle of the road wheel determined by the sensor.

15. The system according to claim 13, wherein the controller is adapted to engage the brake based on a rate of change of the angle of the road wheel determined based on the sensor.

16. A method for providing an end of travel feedback to a driver of a vehicle, the vehicle including a steer by wire system and a road wheel, the method comprising the steps of:

controlling the steer by wire system with a steering mechanism;

sensing an angle of the road wheel is at an end of travel position; and engaging a brake coupled to a shaft of a first motor to provide a mechanical resistance to the steering mechanism, wherein the mechanical resistance applied by the brake is multiplied by a torque transfer mechanism between the shaft and the steering mechanism.

17. The method according to claim 16, wherein the mechanical resistance is generated due to friction created by the brake.

18. The method according to claim 16, wherein the brake is engaged based on the angle of the road wheel.

19. The method according to claim 16, wherein the brake is engaged based on a rate of change of the angle of the road wheel.

20. The method according to claim 16 further comprising the step of controlling an angle of the road wheel using a second motor.

21. The method according to claim 20, wherein the brake is engaged based on a current draw of the motor.

22. The method according to claim 16, further comprising the step of disengaging the brake when the steering wheel is manipulated to rotate the wheel away from the end of travel position.

23. The method according to claim 22, wherein the brake is disengaged based on a steering wheel angle.

24. The method according to claim 22 wherein the brake is disengaged based on a rate of change of a steering wheel angle.

25. The method according to claim 22, wherein the brake is disengaged based on a torque applied to the steering mechanism.

* * * * *